United States Patent [19]

Pratt

[11] 4,249,344
[45] Feb. 10, 1981

[54] TREE BALL GRABBER

[75] Inventor: Lindsay L. Pratt, Cherry Hill, N.J.

[73] Assignee: Grabber, Inc., Cherry Hill, N.J.

[21] Appl. No.: 40,779

[22] Filed: May 21, 1979

[51] Int. Cl.³ .................... A01G 23/04; B65D 63/00
[52] U.S. Cl. ........................... 47/76; 47/73;
  24/269; 24/71.2
[58] Field of Search ............... 47/73, 76; 111/4;
  294/50.7, 31.2; 24/269, 71.2

[56] References Cited

U.S. PATENT DOCUMENTS

| | | | |
|---|---|---|---|
| 451,064 | 4/1891 | McAlpin | 47/73 |
| 835,585 | 11/1906 | Uffmann | 47/76 |
| 1,380,327 | 5/1921 | Weil | 47/76 |
| 1,627,172 | 5/1927 | Gouirand et al. | 24/269 |
| 1,735,346 | 11/1929 | Alford | 24/71.2 X |
| 1,856,016 | 4/1932 | Armstrong | 47/73 X |
| 2,292,310 | 8/1942 | Wilkins | 294/31.2 X |
| 2,405,913 | 8/1946 | Tinnerman | 24/269 |
| 2,428,499 | 10/1947 | Nelson | 294/50.7 |
| 3,673,642 | 7/1972 | Harwell | 24/269 X |
| 4,116,374 | 9/1978 | Garello | 294/31.2 X |

FOREIGN PATENT DOCUMENTS 498087 5/1930 Fed. Rep. of Germany ............ 24/269

*Primary Examiner*—Robert E. Bagwill
*Attorney, Agent, or Firm*—Gravely, Lieder & Woodruff

[57] ABSTRACT

A device for transporting a plant having a root system confined in a ball of earth. The device comprises a flexible strip which is placed around the ball of earth in belt-like fashion, a means for winding the strip so as to tightly grip the ball, and a means for locking the strip in position as the ball is being transported.

4 Claims, 5 Drawing Figures

TREE BALL GRABBER

BACKGROUND OF THE INVENTION

This invention relates to devices for transplanting trees and shrubs, and more particularly, devices used to transport a tree or shrub with its root system encased in a ball of dirt to a new location.

The generally accepted method of transplanting a tree or shrub calls for forming a trench around the plant to be transplanted and cutting under the roots of the plant to leave a compact ball around the base of the plant. The ball is composed of the roots and the earth in which the plant has been growing.

The tree or shrub is generally transported by first enclosing the ball of dirt in burlap sacking, and then shipping the tree to the place where it is to be planted. Weil, U.S. Pat. No. 1,380,327 discloses a transplanting receptacle which operates by enclosing the dirt ball formed by the trenching step.

Cartwright, U.S. Pat. No. 3,316,675 discloses a container for packaging a plant having a root system confined in a ball of earth, which will maintain the plant, its roots, and the ball of earth in their original form during transportation and handling.

BRIEF DESCRIPTION OF THE INVENTION

This invention involves a device for transporting a plant for transplantation purposes. The plants to be treated in this fashion will have a root system confined in a ball of earth. The device comprises a flexible strip which is placed around the ball of earth in belt-like fashion; a means for winding the strip so as to make it grip the ball tightly; and a means for locking the strip as the ball is being transported.

The strip winding means basically comprises an elongated mandrel or reel about which the flexible strip is wound upon itself during the winding operation. The elongated mandrel or reel is rotated by a turning handle which also constitutes the means for locking the strip after it has been tightened into place.

It is an object of this invention to provide a plant transporting device which can be economically used by nursery men, as well as others wishing to transplant a tree or shrub.

It is a further object to provide such a device which eliminates the need to use sacking during transportation of the plant.

It is still a further object to provide such a device which is constructed of inexpensive materials.

DETAILED DESCRIPTION

The tree and shrub ball grabber may be made up of at least three elements:

(1) a flexible strip or band of material,
(2) a wrapping mandrel or reel for the strip or band,
(3) a handle or crank for turning the winding mandrel and for securing the strip or band in place around the tree ball.

The flexible strip or band 10 may have different lengths and different widths. The constraint on these parameters is the volume and configuration of the dirt ball which must be secured to protect and retain the earth for the root system.

Figure 1:
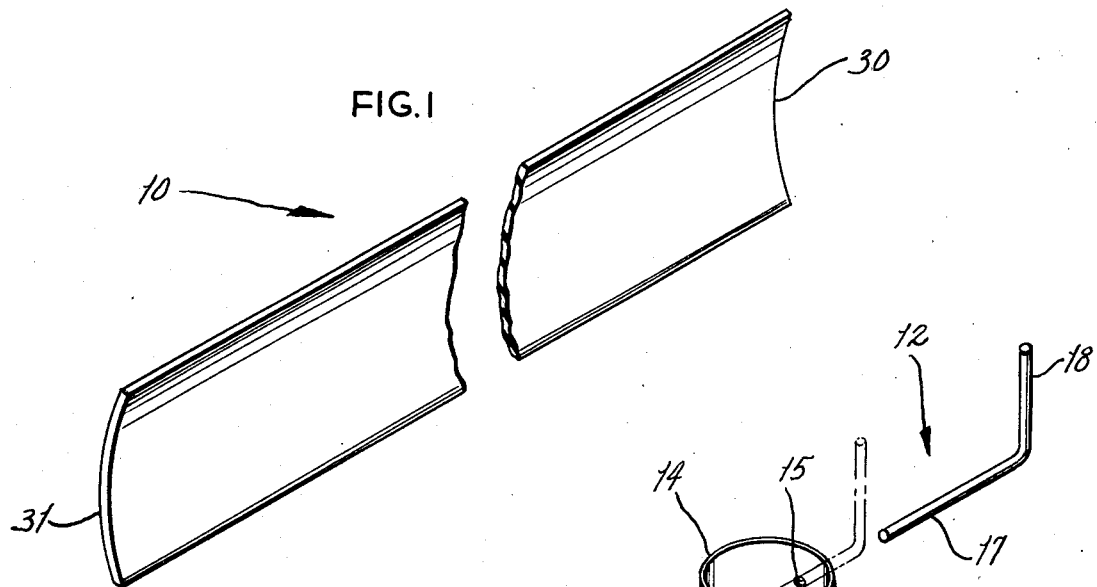
FIG. 1 is a perspective view of a portion of the flexible strip used to grip the ball.

The strip or band 10 is made of flexible or elastic type material, such as synthetic rubber. It is also preferred that the band be arched in transverse section [FIG. 1] to give it a convex curvature as viewed from the outside, along its width dimension, so that the earth ball can fit snugly within the band. This convex curvature can be brought about through the vulcanizing treatment of the material to impart that shape.

Figure 2:
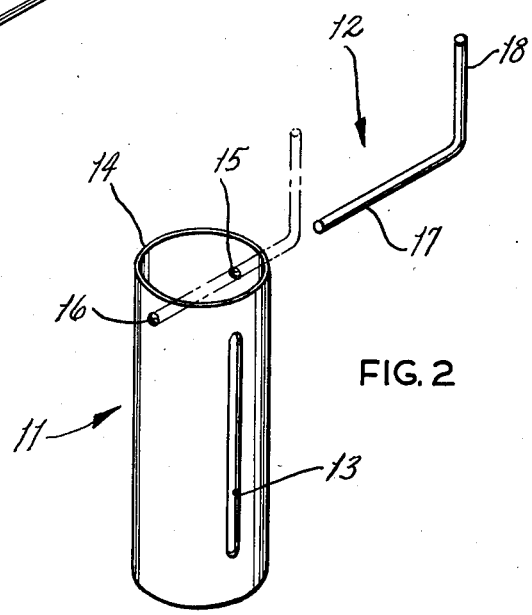
FIG. 2 is an exploded perspective view of one embodiment of the wrapping mandrel or reel and crank for the flexible strip.

The means for wrapping the flexible strip 10 over itself comprises a mandrel or reel 11 and a handle or crank 12. [FIG. 2]. In the embodiment of FIG. 2, the reel 11 is an elongated tube having an elliptical or circular cross section. The tube is hollow to avoid excess weight without sacrificing strength. A slot 13 is located in the wall of the reel 11 to extend lengthwise thereof. At one end 14 of the reel 11 two apertures 15 and 16 are located so that they are diametrically opposed. The reel 11 has a length in excess of the width of the flexible strip 10. The slot 13 is of a length only slightly greater than the width of the strip 10.

The crank 12 is preferably an L-shaped element. One leg 17 of the crank 12 is capable of being inserted through apertures 15 and 16 which are disposed at the end 14 of the reel 11. The other leg 18 of the crank 12 is gripped by the user for the purpose of applying the necessary force to turn the crank 12 which, in turn, causes rotation of the reel 11. When the strip 10 is wound to the degree desired the crank 12 is rotated about the axis of the leg 17 so the leg 18 can be inserted into the dirt ball behind the strip 10 to keep the strip 10 and the tube 11 in such a position so as to prevent unwinding of the strip.

Figure 3:
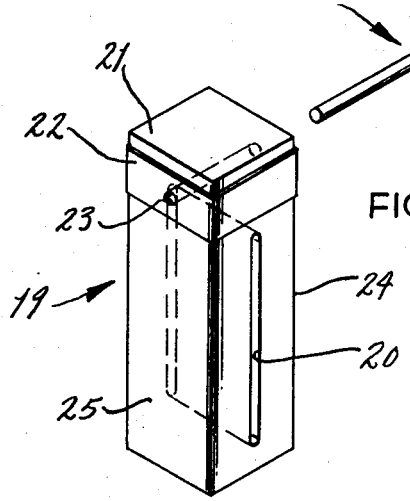
FIG. 3 is an exploded perspective view of another embodiment of the wrapping mandrel or reel and crank for the flexible strip.

In a second embodiment [FIG. 3] the reel is in the form of a solid body 19 formed from an elongated piece of plastic stock having a substantially square cross section. A slot 20 extends completely through the body of reel 19. At one end 21 of the reel 19 a reinforcing band 22 is located, and a hole 23 is formed to penetrate the band 22 and the reel body so that the axis of the hole 22 is perpendicular to the sides 24 and 25 of the body. The body of the reel 19 has a length in excess of the width of the flexible strip 10, while the slot 20 has a length only slightly greater than the width of the strip 10 and a width to receive both ends of the strip 10.

The crank 26 is substantially identical to the crank 12 to be used in the previously described embodiment.

OPERATION

Figure 4:
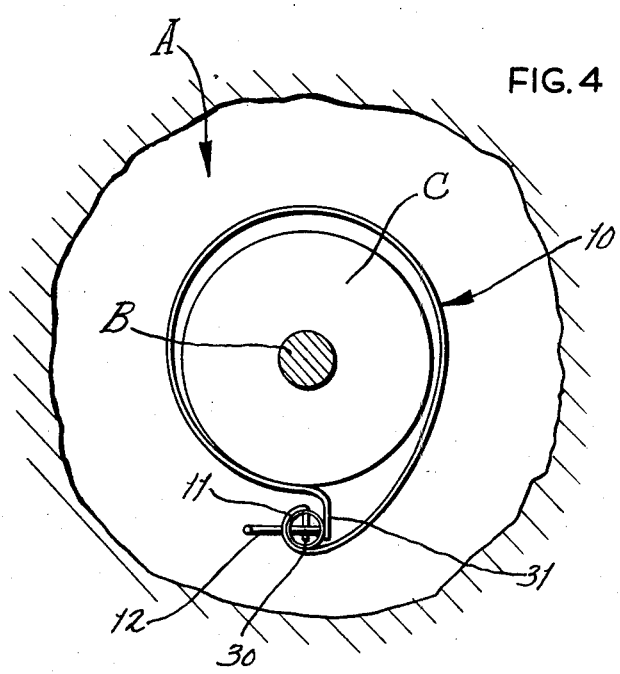
FIG. 4 is a plan view of the first embodiment of the tree ball grabber in position around the ball prior to being wound.

A trench "A" [FIG. 4] is first dug around the tree or shrub "B" which is to be transplanted. The circumference of the tree ball "C" formed by the digging should be sufficient to contain the desired root system, and the length of the flexible strip 10 should be sufficient to loosely encircle the ball. The depth of the trench "A"

should be somewhat greater than the width of the flexible strip 10.

Figure 5:
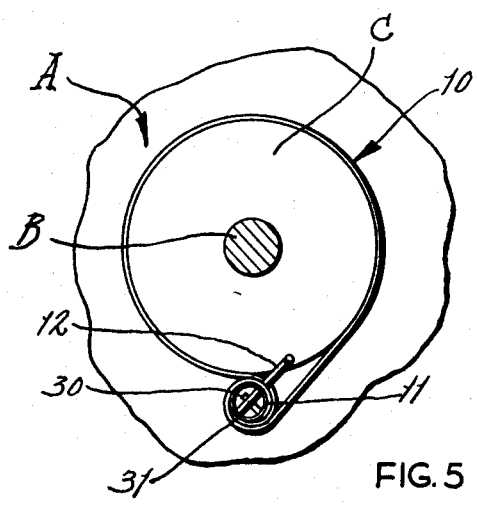
FIG. 5 is a plan view of the first embodiment of the tree ball grabber in final position around the ball, and with the mandrel or reel locked in place by the crank.

Referring now to FIGS. 4 and 5, one end 30 of the flexible strip 10 is inserted into slot 13 of the reel 11. The aperatures 15 and 16 should be at the upper end of the reel 11.

The other end 31 of the flexible strip 10 is placed around the earth ball, and further pointed into place between the first wrap of end 30 about reel 11 or with the end caught between the reel 11 and the inner side of strip 10.

One leg 17 of the crank 12 is inserted into the apertures 15 and 16 in the reel 11. The other leg 18 of the crank 12 is grasped by the user and is employed to rotate the reel 11, in this case in a clockwise direction. The rotation of the reel 11 causes the ends 30 and 31 of the flexible strip 10 to be wound about the reel 11. When the strip 10 is wound so that the tree ball is snugly enveloped, the leg 18 of the crank 12 which had been grasped by the user during the winding operation is rotated in a direction so it can be inserted into the dirt ball to lock the reel 11 in place. A shovel is then used to break the dirt and roots under the dirt ball. The ball may then be lifted and transported to the desired area for transplanting.

The embodiment seen in FIG. 3 is employed in substantially the same manner as has been described for the embodiment of FIG. 2 in relation to the views of FIGS. 4 and 5. It is not deemed necessary to repeat that description.

In view of the foregoing description, it is to be understood that some variations of the disclosed embodiments may come to mind, such as the choice of materials to render the device economical to produce, or to enable the device to be reusable many times.

What is claimed:

1. A transplanting device for preserving the integrity of the earth embedded root system of a plant or shrub in a ball of earth, said device comprising:
   (a) a strip of flexible material having two ends and a length sufficient to wrap around an earth ball embedding the root system of a plant or shrub, said strip forming a belt surrounding and conforming to the earth embedded root system;
   (b) a winding mandrel presenting a surface to said strip which is longer than the strip is wide, said winding mandrel having a means for engaging at least one end of said flexible strip and positioning the other end of said strip for frictional engagement in lapped relation between a portion of said strip adjacent said one end and said mandrel to bind said other end in position under said strip and against said mandrel; and
   (c) means engaging said mandrel for turning said mandrel in a direction such that it wraps into said strip and draws said strip about the earth ball to preserve the integrity of the earth ball, said turning means having a portion thereof in position to be inserted between said strip and the earth ball, thereby locking said mandrel turning means to said strip for retaining said strip in wrapped position.

2. The device of claim 1 wherein said mandrel comprises an elongated body having a pair of diametrically opposed apertures disposed at one end, said means engaging said one end of said strip being an elongated slot formed in said mandrel for receiving said one end of said flexible material, and a crank having a shaft insertable into said holes for turning said body on said strip.

3. The device of claim 2 wherein said crank is an L-shaped rod, wherein one leg of said rod is inserted into the diametrically opposed holes in the elongated body, and the other leg of the rod is inserted between said strip and the dirt of said dirt ball so as to be retained behind said strip.

4. The device of claim 1 wherein the mandrel comprises an elongated body having a square cross section, and further having a hole formed adjacent at one end thereof, an elongated slot penetrating said body through a pair of opposite walls for receiving at least one of the ends of said flexible material, and a crank having a shaft insertable into said hole for turning said body on said strip.

* * * * *